No. 715,170. Patented Dec. 2, 1902.
R. S. STEWART.
HOT WIRE ELECTRIC METER.
(Application filed Apr. 26, 1902.)
(No Model.)
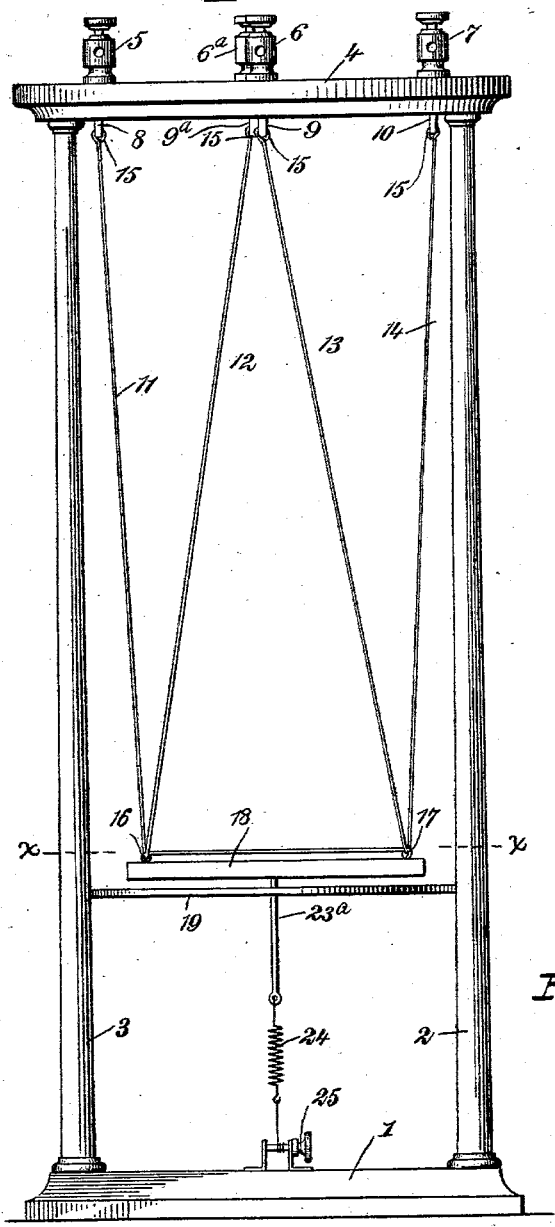
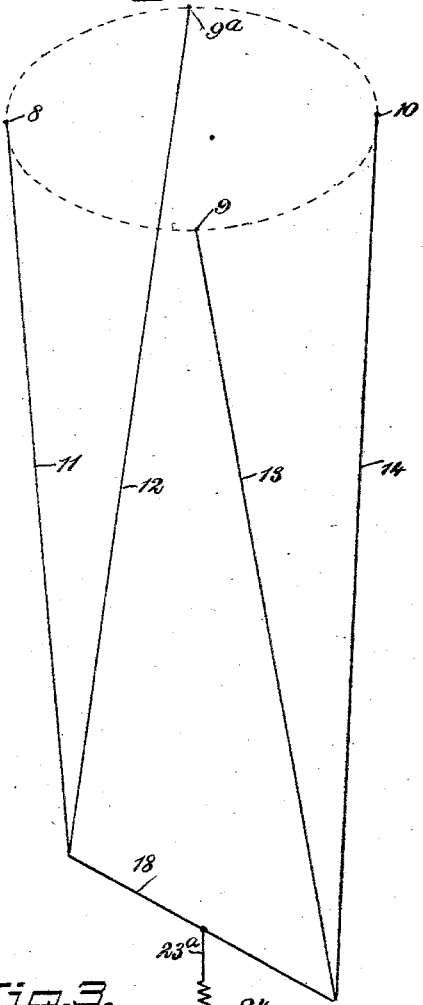
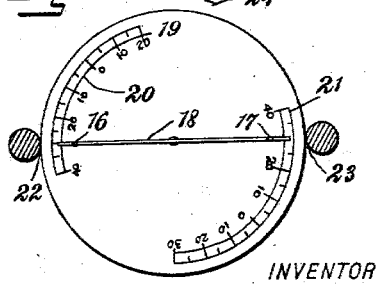
WITNESSES:
James F. Duhamel
Walton Harrison
INVENTOR
Robert S. Stewart
BY
ATTORNEYS

UNITED STATES PATENT OFFICE.

ROBERT STUART STEWART, OF DETROIT, MICHIGAN.

HOT-WIRE ELECTRIC METER.

SPECIFICATION forming part of Letters Patent No. 715,170, dated December 2, 1902.

Application filed April 26, 1902. Serial No. 104,777. (No model.)

*To all whom it may concern:*

Be it known that I, ROBERT STUART STEWART, a citizen of the United States, and a resident of Detroit, in the county of Wayne and State of Michigan, have invented a new and Improved Hot-Wire Electric Meter, of which the following is a full, clear, and exact description.

My invention relates to a meter for making electrical measurements of various kinds and capable of use as a voltmeter, differential voltmeter, ammeter, &c., according to the materials used in its construction and the proportion of the parts. It is also capable of use with both alternating and direct currents.

Reference is to be had to the accompanying drawings, forming a part of this specification, in which similar characters of reference indicate corresponding parts in all the figures.

Figure 1 is a side elevation of my device complete. Fig. 2 is a diagram in perspective of the working parts of the meter, and Fig. 3 is a horizontal section upon the line $x\ x$ of Fig. 1.

Upon the base 1 are mounted vertical standards 2 3, upon the tops of which is secured a plate 4, provided with binding-posts 5 6 $6^a$ 7. To these binding-posts are electrically connected posts 8 9 $9^a$ 10, to which the wires 11 14 and 12 13 are fastened.

11 14 constitute one continuous wire, and 12 13 another of the same length. These wires may either be threaded through eyes 16 17 in the bar 18 or may be fastened to the bar in any appropriate manner. It is preferable for many uses of the instrument that the two wires be electrically insulated from each other. The bar 18 may be of any shape suitable and may be made of any non-magnetic substance. Its uses are to hold the wires in a fixed definite shape and to carry a pointer by which any deflection from its original position may be measured on a scale provided for this purpose. A horizontal disk 19 is provided with graduations 20 21 and secured at the points 22 23 upon the standards 2 3, the bar 18 being suspended immediately over this disk 19. The bar 18 may be steadied by the vertical wire $23^a$ and slightly tensioned, if desired, by the spring 24 and adjusting-screw 25. For delicate measurements the pointer may be replaced by a small mirror and the deflections read by optical means. In order that the wires may be kept under some tension, the bar 18 is made of some weight, or for portable instruments the spring 24 is fastened to the center of the bar.

The four posts 8, 9, $9^a$, and 10 are on the circumference of a circle at the ends of diameters which are at right angles to each other. The diameter of this circle will ordinarily be equal to the length of the bar 18, but this is not necessary. All deflections of the bar are in a horizontal plane.

*Operation of the instrument.*—To measure an electric current, the circuit is connected to the binding-posts 5 and 7. The current to be measured will then pass through the wire 11 14, and this wire will expand by an amount proportional to the square of the current due to the heating effect. As the wire 12 13 has no current flowing through it, its length will remain unchanged and the bar 18 will take a new position in the horizontal plane in which it lies. This deflection of the bar from its original position is a measure of the increase in the length of the wire 11 14, and consequently of the square of the current flowing in the wire 11 14. To measure the difference between two currents, I connect one circuit to the posts 5 and 7 and the other to the posts 6 and $6^a$. One current will then flow through the wire 11 14 and the other through the wire 12 13. If the two currents are equal, the two wires will expand by equal amounts and there will be no deflection; but if one current is greater than the other the deflection will measure the difference in the squares of the two currents.

*Theory of the instrument.*—Let us call the length of the wires 11 12 13 14 each equal to 1, the length of the bar between the two wires equal to N, the distance between 8 and 10 and 9 and $9^a$ also equal to N, the increase in the length of the wires 11 and 14 due to expansion equal to $d'$, and the angle through which the bar is deflected due to this expansion equal to X. We then have the relation $$\frac{d'}{1} = \frac{N^2}{\sqrt{81^2}} \text{ sine } x \frac{d'}{1} =$$

the percentage of expansion and is proportional to the sine of the angle of deflection, $\frac{N^2}{\sqrt{81^2}}$ being a constant for the instrument; but this percentage of expansion being due to the heat in the wire, and therefore proportional to the square of the current, the expression for the value of the current is $$C = K \frac{N}{\sqrt{4\,81}} \text{ sine } x,$$

in which K is a constant depending on the material of which the wire is composed. If we are measuring the difference between two currents C' and C'' flowing in the two wires, the formula becomes $$C'^2 - C''^2 = \frac{K^2 N^2}{\sqrt{81^2}} \text{ sine } x.$$

In these equations the weight of the bar, tension of the spring, and surrounding temperature do not enter, and the results are therefore independent of these quantities. The constant $\frac{N}{l}$, which is a measure of the sensibility of the instrument, indicates that we can increase the sensibility either by decreasing the length of the bar or increasing the length of the wires.

Friction does not affect the instrument in any way, for there are no pivots or sliding contacts to cause friction. The measurements are not affected by proximity to magnets.

By suitable choice of the material of which the wires are made and by the use of the customary resistances the apparatus can be built for a voltmeter, ammeter, differential voltmeter, or synchroscope for paralleling alternators. In this last capacity it indicates when the voltages, phases, and frequency of the two machines are the same by a single zero reading.

Having thus described my invention, I claim as new and desire to secure by Letters Patent—

1. A hot-wire electric meter, comprising a frame, two wires suspended therefrom, a pointer fastened to said wires and free to deflect when the length of said wires is changed, means for measuring the deflections of said pointer, and electrical connections for sending electric currents through either or both of said wires for the purpose of heating the same.

2. A hot-wire electric meter, comprising a frame, two "bifilar suspensions" attached to said frame and fastened to a single pointer, and so adjusted with respect to each other that any change in the length of either suspension will cause a deflection of said pointer, said bifilar suspensions being composed of wires of conducting material and so arranged that an electric current may be passed through either or both of said bifilar suspensions for the purpose of heating the same.

3. The combination of two "bifilar suspensions," composed of wires of electric-conducting material so arranged as to exert equal and opposite forces upon a single pointer attached to both said suspensions, electrical connections by which electric currents may be passed through either or both of said bifilar suspensions, thereby heating and changing the length of either or both said bifilar suspensions, and so altering the forces acting on the pointer that they will cause it to take a new position in space.

In testimony whereof I have signed my name to this specification in the presence of two subscribing witnesses.

ROBERT STUART STEWART.

Witnesses:
MARY B. STEWART,
MATTHEW B. WHITTLESEY.